United States Patent
Liu et al.

(10) Patent No.: US 11,912,580 B2
(45) Date of Patent: Feb. 27, 2024

(54) NANO MAGNESIUM HYDRIDE AND IN-SITU PREPARATION METHOD THEREOF

(71) Applicant: ZHEJIANG UNIVERSITY, Zhejiang (CN)

(72) Inventors: Yongfeng Liu, Zhejiang (CN); Xin Zhang, Zhejiang (CN); Hongge Pan, Zhejiang (CN); Mingxia Gao, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 719 days.

(21) Appl. No.: 17/058,659

(22) PCT Filed: Mar. 13, 2020

(86) PCT No.: PCT/CN2020/079105
§ 371 (c)(1),
(2) Date: Nov. 25, 2020

(87) PCT Pub. No.: WO2020/207188
PCT Pub. Date: Oct. 15, 2020

(65) Prior Publication Data
US 2021/0198107 A1 Jul. 1, 2021

(30) Foreign Application Priority Data
Apr. 10, 2019 (CN) .......................... 201910286493.2

(51) Int. Cl.
*C01B 6/04* (2006.01)
*C01B 3/00* (2006.01)
(Continued)

(52) U.S. Cl.
CPC .............. *C01B 6/04* (2013.01); *C01B 3/0026* (2013.01); *B82Y 30/00* (2013.01); *B82Y 40/00* (2013.01);
(Continued)

(58) Field of Classification Search
CPC ........... C01B 6/04; C01B 6/24; C01B 3/0026; C01B 3/001; B82Y 30/00; B82Y 40/00;
(Continued)

(56) References Cited

U.S. PATENT DOCUMENTS 4,554,153 A * 11/1985 Bogdanovic ........... B82Y 30/00
420/900

FOREIGN PATENT DOCUMENTS

| CA | 1294414 | 1/1992 |
|---|---|---|
| CN | 101117211 | 2/2008 |

(Continued)

OTHER PUBLICATIONS

Ashby et al. Inorg.Chem. 1971, 10, 355-357 (Year: 1971).*
(Continued)

*Primary Examiner* — Anthony J Zimmer
*Assistant Examiner* — Jordan W Taylor
(74) *Attorney, Agent, or Firm* — JCIPRNET

(57) ABSTRACT

The invention discloses nano magnesium hydride and an in-situ preparation method thereof, including disposing and stirring magnesium chloride and lithium hydride in an organic solvent under a protection of an inert atmosphere, so as to obtain an organic suspension of a mixture; performing an ultrasonic treatment to the organic suspension, so as to promote a chemical reaction of the mixture. After the reaction is completed, the suspension is filtered; the solid reaction product is washed, centrifuged and dried to remove residual organic matter, so as to obtain nano-magnesium hydride.

12 Claims, 12 Drawing Sheets

(51) Int. Cl.
    *B82Y 30/00*     (2011.01)
    *B82Y 40/00*     (2011.01)

(52) U.S. Cl.
    CPC ...... *C01P 2002/72* (2013.01); *C01P 2002/85* (2013.01); *C01P 2002/89* (2013.01); *C01P 2004/03* (2013.01); *C01P 2004/04* (2013.01); *C01P 2004/64* (2013.01)

(58) Field of Classification Search
    CPC .............. C01P 2002/72; C01P 2002/85; C01P 2002/89; C01P 2004/03; C01P 2004/04; C01P 2004/64; Y02E 60/32
    See application file for complete search history.

(56) References Cited

FOREIGN PATENT DOCUMENTS

| CN | 106865497 | 6/2017 |
|---|---|---|
| CN | 107915203 | 4/2018 |
| CN | 107995905 | 5/2018 |
| CN | 109012664 | 12/2018 |
| CN | 110116990 | 8/2019 |
| EP | 0090926 | 10/1983 |
| WO | 2016144396 | 9/2016 |

OTHER PUBLICATIONS

Ares et al. Ultrasonics Sonochemistry 2009, 16, 810-816 (Year: 2009).*

Paskevicius J. Am. Chem. Soc. 2010, 132, 5077-5083 (Year: 2010).*

Liu et al. J. Phys. Chem. C 2014, 118, 18401-18411 (Year: 2014).*

"International Search Report (Form PCT/ISA/210) of PCT/CN2020/079105," dated Jun. 12, 2020, pp. 1-5.

Shu Li, et al., "Influence of chloride salts on hydrogen generation via hydrolysis of MgH2 prepared by hydriding combustion synthesis and mechanical milling," Transactions of Nonferrous Metals Society of China, vol. 27, Mar. 2017, pp. 562-568.

\* cited by examiner

NANO MAGNESIUM HYDRIDE AND IN-SITU PREPARATION METHOD THEREOF

CROSS-REFERENCE TO RELATED APPLICATION

This is a continuation-in-part application of International Application No. PCT/CN2020/079105, filed on Mar. 13, 2020, which claims the priority benefits of China Application No. 201910286493.2, filed on Apr. 10, 2019. The entirety of each of the above-mentioned patent applications is hereby incorporated by reference herein and made a part of this specification.

BACKGROUND

Technical Field

The invention relates to the technical field of hydrogen storage materials and nano materials, in particular to an in-situ preparation method of nano magnesium hydride.

Description of Related Art

The ever-growing energy crisis and the deterioration of the global environment have accelerated the development of renewable clean energy. Hydrogen energy has attracted considerable attention because of its abundant reserves and clean and non-pollution. At present, the main bottleneck restricting the hydrogen economy is the storage and transportation of hydrogen. And the development of solid state hydrogen storage materials based on chemical hydrogen storage is regarded as the most effective way to address onboard hydrogen storage for vehicular applications.

$MgH_2$ is a typical light metal hydride hydrogen storage material, with a theoretical hydrogen storage capacity of 7.6 wt % and good reversibility, which has attracted extensive attention from researchers. However, with high thermodynamic stability, the initial hydrogen release temperature is as high as 300° C., and the hydrogen release rate is slow, which prevent it from the practical application of on-board hydrogen storage. Therefore, reducing the hydrogen absorption and desorption temperature of $MgH_2$ has been the focus of research in this field.

At present, the research on the modification of $MgH_2$ hydrogen storage materials mainly focuses on: (1) doping catalyst, (2) regulating composition, and (3) nanostructuring.

Catalyst doping is the most frequently studied modification method at present, which can significantly improve the hydrogenation and dehydrogenation kinetic performance of $MgH_2$ associated with a high hydrogen storage capacity. Based on the method, it has been found that Ti-, Zr-, V-, Nb-, Ni- and Co-based catalysts have a significant effect on the dehydrogenation/dehydrogenation kinetic properties of $MgH_2$. However, the thermodynamics of $MgH_2$ is relatively stable, and the initial hydrogen release temperature is still quite high. Moreover, the existing catalysts are mainly based on transition metal oxides and halides, which easily react with $MgH_2$ to produce by-products such as $MgCl_2$ and $MgO$ during heating, resulting in a loss of hydrogen storage capacity.

Compared with the addition of catalysts, it is expected that the thermodynamic and kinetic properties of $MgH_2$ can be adjusted simultaneously by nanostructuring, so that the initial dehydrogenation temperature of $MgH_2$ can be significantly reduced and the dehydrogenation rate can be increased. However, most of the existing nanostruturing technologies are based on $MgH_2$ nanoparticles supported on high specific surface materials. In order to avoid particle growth or agglomeration during the preparation of nano magnesium hydride, it is necessary to introduce a large amount of carbon, mesoporous silicon and other carrier materials to disperse the nano-product, which will significantly reduce the hydrogen storage capacity of the material and is unfavorable for practical applications.

Therefore, it is the most feasible way to further improve the hydrogen storage materials of $MgH_2$ by preparing metal catalysts with small particle size and high catalytic activity, as well as developing the preparation technology of nano-$MgH_2$ without supports or scaffolds. In particular, developing the in-situ catalysis technology of support-free nano-magnesium hydride to combine the catalyst doping with nanostructuring is highly desired.

SUMMARY

The purpose of the invention is to provide an in-situ preparation method of catalyst-doped nano magnesium hydride. The method is based on the reaction [$MgCl_2$-$2LiH \rightarrow MgH_2 + 2LiCl$] and utilizes the cavitation effect induced by ultrasonic wave in a liquid medium, which rapidly provides energy in an extremely small region, so as to promote the reaction. At the same time, the dispersion effect of ultrasonic wave is used to control the particle size of the product and avoid particle agglomeration, which can effectively realize the nanostructuring of magnesium hydride. By adding proper catalyst precursor in the preparation process, in-situ catalyst doping can be realized. The preparation method is simple and no support or scaffold is needed. The catalyst doped magnesium hydride hydrogen storage material obtained has the advantages of high effective hydrogen storage capacity, low hydrogen absorption and discharge temperature and high hydrogen absorption and discharge rate.

The specific technical solutions are as follows:

An in-situ preparation method of nano-magnesium hydride includes the steps of:

(1) Under a protection of an inert atmosphere, magnesium chloride and lithium hydride are disposed and stirred in an organic solvent to obtain an organic suspension of a mixture;

(2) Under a protection of an inert atmosphere, the organic suspension is subjected to ultrasonic treatment, so as to promote a chemical reaction of the mixture. After the reaction is completed, a solid reaction product is obtained through filtration.

(3) Under a protection of an inert atmosphere, the solid reaction product is washed by organic solvent, centrifuged and dried, and the residual organic material is removed to obtain nano magnesium hydride.

The invention provides a driven force by cavitation effect caused by ultrasonic wave in liquid medium to promote the chemical reaction between magnesium chloride and lithium hydride. Meanwhile, the crushing effect of ultrasonic wave is used to control the particle size of products and inhibit the agglomeration of nanoparticles, so as to obtain nanoscale magnesium hydride. The experiment is carried out under an inert atmosphere, such as argon, etc.

The invention capitalizes on the ultrasonic treatment to accelerate the reaction of raw materials and control the particle size of the product, and realize the preparation of nano-magnesium hydride by simplifying the operation steps and reducing the energy consumption of the reaction.

Preferably, in step (1), before magnesium chloride and lithium hydride are added to the organic solvent, the magnesium chloride and lithium hydride are respectively ball-milled to obtain the ball-milled mixed powder; the purpose of the above steps is to refine the raw material so that it can be better dispersed into the organic solvent in the subsequent operation.

A rotation speed of ball milling is 100-400 r.p.m. and a time is 3-12 hours.

Further, in step (1), the magnesium chloride is anhydrous magnesium chloride, and a molar ratio of magnesium chloride to lithium hydride is 1:2; this ratio can fully convert magnesium chloride into magnesium hydride, and lithium hydride into lithium chloride, in accordance with the following reaction equation:

$$MgCl_2 + 2LiH \rightarrow MgH_2 + 2LiCl \qquad (1)$$

Further, the organic solvents are ultra-dry tetrahydrofuran, ultra-dry cyclohexane or ultra-dry diethyl ether.

Further, use step (A) instead of step (1).

Step (A): Magnesium chloride, lithium hydride and transition metal chloride are placed together in organic solvent and stirred to obtain the organic suspension. Step (2) and step (3) are followed to obtain the catalyst-doped nano magnesium hydride.

The transition metal chloride is an anhydrous chloride, specifically titanium tetrachloride, titanium trichloride, zirconium tetrachloride, vanadium trichloride, niobium pentachloride, nickel dichloride or cobalt dichloride.

The invention uses transition metal chloride as the catalyst precursor, magnesium chloride as the magnesium source, lithium hydride as the hydrogen source and reducing agent, and the cavitation effect generated by ultrasonic waves as the driven force. The powder is dispersed in an organic solvent for ultrasonic treatment to promote chemical reaction between lithium hydride and magnesium chloride, so as to produce magnesium hydride and lithium chloride. At the same time, lithium hydride reduces the transition metal chlorides to elemental metals, so as to generate lithium chloride. In the ultrasonic cleaning process of solid reaction products with organic solvent, the by-product lithium chloride can be dissolved and removed, and then centrifuged or filtrated to obtain solid powder materials, which are then dried in dynamic vacuum, so as to obtain nano magnesium hydride doped with transition metal catalyst.

Further, for different transition metal chlorides, the molar ratios of transition metal chloride and magnesium chloride are slightly different. Among them, for titanium tetrachloride and titanium trichloride, the molar ratio of transition metal chloride to magnesium chloride is 0.01-0.05:1, so that the sample can have a better hydrogen absorption kinetics, and has little influence on the hydrogen storage capacity. Beyond this range, the effect is not good. For zirconium tetrachloride, vanadium trichloride, niobium pentachloride, nickel dichloride and cobalt dichloride, the molar ratio of transition metal chloride to magnesium chloride is 0.01-0.1:1.

Furthermore, the molar ratio of lithium hydride and chloride ions in transition metal chloride is 1:1. This ratio can make the metal chloride fully reduced and all lithium hydrides converted to lithium chloride.

Further, in step (2), the power of the ultrasonic is 100-600 W, the single ultrasonic time is 0.5-1 hour, the pause time is 10-30 minutes, and the cumulative ultrasonic time is 3-24 hours. With the extension of ultrasonic time, the reaction degree of raw materials gradually increases, and the yield of $MgH_2$ also increases. However, the longer ultrasonic time will significantly increase the temperature of the system, which causes the growth of $MgH_2$ particles, and slows down the hydrogen absorption kinetics of the obtained products. Similar to prolonging the ultrasonic time, the higher power will cause excess energy, and increasing the temperature of the system will cause the particles of the product to increase, which is not conducive to the performance of the product.

More preferably, the ultrasonic power is 210 W, the single ultrasonic time is 0.5 h, the pause time is 30 minutes, and the cumulative ultrasonic time is 6 h.

Further, in step (2), an ultrasonic horn is inserted into the organic suspension for ultrasonic treatment. Ultrasound results with different ultrasonic instruments are different; while the ultrasonic equipment equipped with ultrasonic horns is used for preparation, the ultrasonic efficiency is higher, and the reaction rate is faster, while the ultrasonic cleaning machine is used for preparation, the reaction acceleration effect is not good, and the reaction rate is slow.

Further, in step (3), the organic solvent is ultra-dry tetrahydrofuran or ultra-dry acetone; the cleaning time is 1-2 h, which can ensure that the by-product lithium chloride is fully dissolved. The drying is realized by heating under the protection of a vacuum environment (vacuum degree not less than $1 \times 10^{-3}$ Torr) or an inert atmosphere, and the processing time is 1-2 h.

The multiple centrifugation operations in step (3) need to load the sample into the centrifuge tube and seal it to prevent water and oxygen pollution. The centrifugal speed is 5000-10000 r.p.m., and the centrifugation time is 5-20 minutes.

The invention provides a nano magnesium hydride prepared by the in situ preparation method.

Comparing to the present techniques, this invention has the following advantages:

(1) The invention uses the cavitation effect produced by ultrasonic waves as the energy source to promote the chemical reaction between magnesium chloride and lithium hydride. At the same time, the particle size of the product is controlled by using the crushing effect of ultrasonic wave to inhibit the agglomeration of nanoparticles and avoid the side effects caused by the addition of various scaffold materials to inhibit the particle growth. Thus, nanoscale magnesium hydride is obtained and the high hydrogen storage capacity of the product is maintained.

(2) By adding magnesium chloride, lithium hydride and transition metal chloride together into an organic solvent for ultrasonic treatment, the nanolization and catalyst doping of magnesium hydride can be realized simultaneously, and the nano effect and nano-catalysis effect can be fully utilized to greatly reduce the dehydrogenation temperature of magnesium hydride.

(3) The invention utilizes LiH as a reducing agent to fully reduce the high-value metal while preparing nano magnesium hydride. In addition, the reaction precursor $MgCl_2$ is easily soluble in organic solvents such as tetrahydrofuran, and LiH usually floats on the surface of the solvent with low density. Lithium chloride, as a by-product, is soluble in a variety of organic solvents. It is easy to remove these substances after the reaction to ensure the purity of the final product.

(4) Compared with the existing metal oxide ($TiO_2$, $ZrO_2$, etc.) or halide (TiF, $TiCl_3$, $ZrCl_4$, etc.) catalysts, the catalyst prepared by the method of the invention will not yield by-products similar to $MgCl_2$ or MgO when mixed with magnesium hydride hydrogen storage materials. It is beneficial to maintain high capacity of hydrogen storage materials, and the catalyst is generated simultaneously with nano magnesium hydride, which realizes the nanostructuring of the material and the catalyst doping. The catalyst is uniformly distributed in the magnesium hydride nano particle, and the catalytic effect is excellent.

(5) The particle size of the nano magnesium hydride prepared by the invention is maintained within 5 nm, the hydrogen storage capacity is high, and the hydrogen absorption and discharge temperature is significantly lower than that of the nano magnesium hydride prepared by conventional techniques.

DESCRIPTION OF THE EMBODIMENTS

The following is a further description of the invention in combination with specific examples. The following are only specific examples of the invention, but the scope of protection of the invention is not limited to this.

Example 1 Preparation of Nano Magnesium Hydride (1) Put 500 mg of anhydrous magnesium chloride and 500 mg of lithium hydride into a ball mill jar in an argon atmosphere glove box, and crush them for 3 hours at a speed of 350 r.p.m.;

(2) In an argon atmosphere glove box, take a total of 600 mg of ball-milled anhydrous magnesium chloride and lithium hydride (molar ratio 1:2) and put them into a 250 ml flask. Then, pour 150 ml of ultra-dry tetrahydrofuran into the flask and stir for 30 min, wait until the magnesium chloride is fully dissolved;

(3) Insert the ultrasonic horn into the flask, keep the end of the ultrasonic horn in the middle of the mixture in the flask, and perform ultrasonic treatment with 210 W output power. During the ultrasonic process, in order to keep the sample temperature from rising, the ultrasonic must be paused after half an hour. After 6 hours of treatment, an ultrasonic product can be obtained;

(4) Using centrifugation (8000 r.p.m.), separate the solid powder in the product after ultrasound in step (3), put it into a 100 ml flask, and inject 50 ml of ultra-dry tetrahydrofuran, stir for 2 hours for cleaning, so that the by-product lithium chloride can be fully dissolved in tetrahydrofuran;

(5) The solid powder obtained in step (4) is separated by centrifugation (8000 r.p.m.), washed with tetrahydrofuran and centrifuged to obtain the solid powder, and heated for 2 hours in a dynamic vacuum (vacuum degree of $1\times10^{-3}$ Torr). After removing the residual tetrahydrofuran, the nano-magnesium hydride can be obtained, and then the sample is stored in the glove box for later use.

Figure 1:
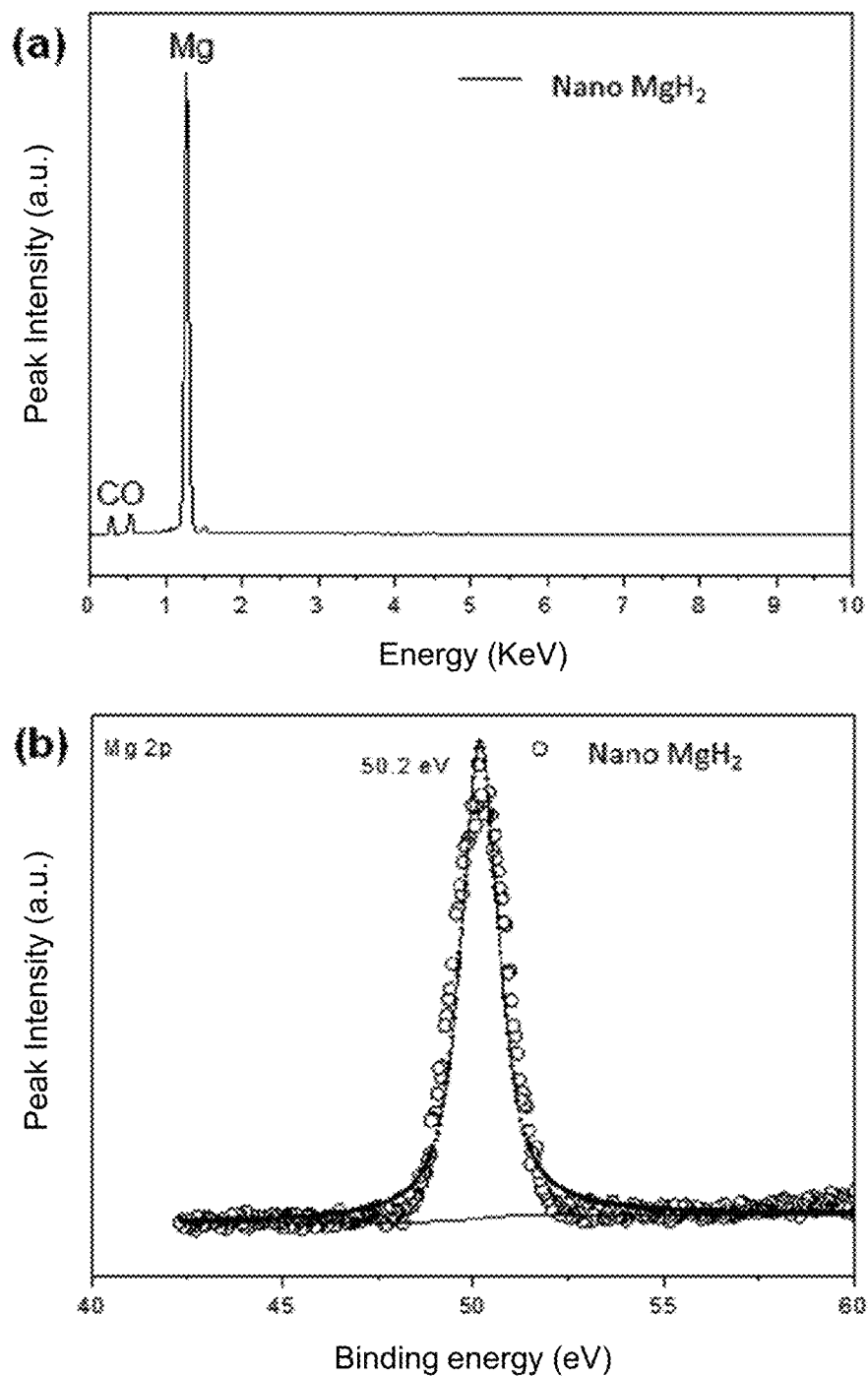
FIG. 1 shows (a) an EDS spectrum and (b) an XPS pattern of the nano magnesium hydride prepared in example 1.

The sample prepared in the above process is the nano-magnesium hydride. As can be seen from FIG. 1(a), the sample only contains magnesium, and the weak oxygen signal and carbon signal are derived from carbon and oxygen pollution in the air or trace organic solvent residue, indicating that the sample is composed of magnesium. It can be seen from FIG. 1(b) that the 2p spin orbit peak of magnesium in the obtained sample is located at 50.2 eV, indicating that all the magnesium in the sample exists in the form of magnesium hydride.

Figure 2:
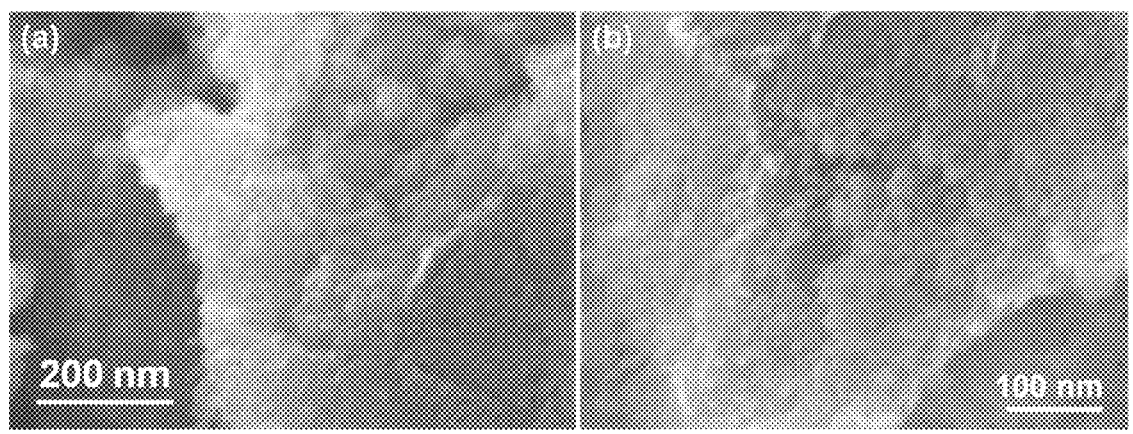
FIG. 2 shows SEM images of the nano magnesium hydride prepared in example 1.

It can be seen from FIG. 2 that the sample is composed of a large number of nano magnesium hydride, and the particles are spherical morphology.

Figure 3:
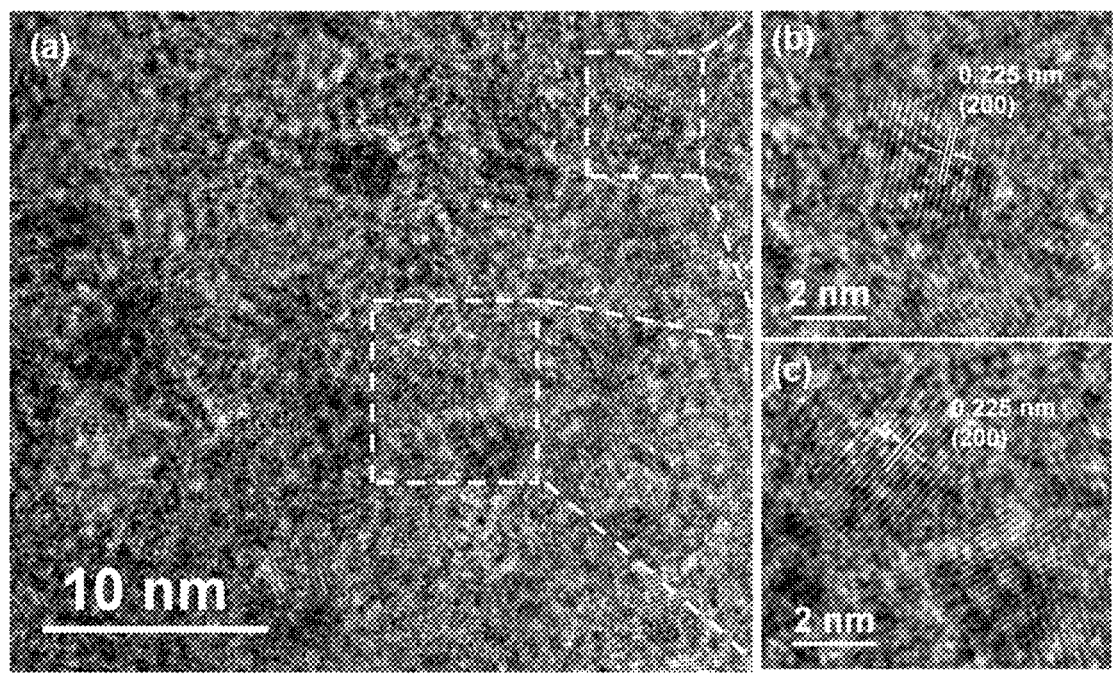
FIG. 3 shows (a) the TEM image and (b, c) the high-resolution TEM images of magnesium hydride nanoparticles prepared in example 1.

It can be seen from FIG. 3 that the size of nano magnesium hydride is basically maintained at 5 nm. From the high-resolution TEM image, it can be calibrated that the interplanar spacing of magnesium hydride particles of 0.225 nm corresponds to the (200) crystal plane.

Figure 4:
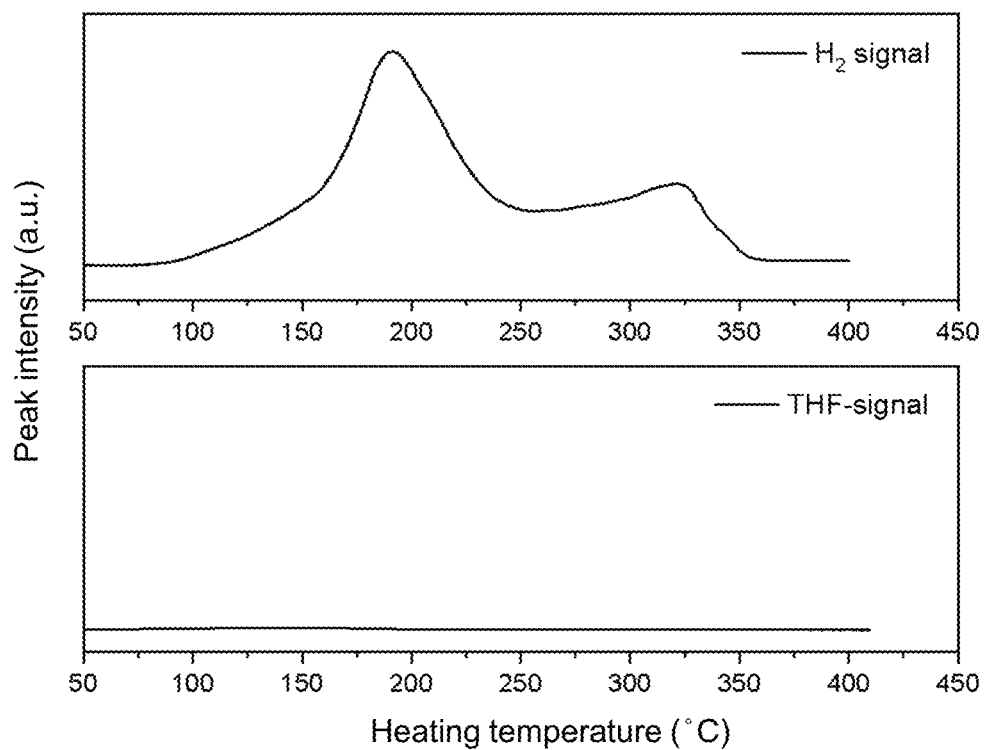
FIG. 4 shows the temperature-dependent degassing mass spectrum curves of the nano-magnesium hydride prepared in example 1: (a) hydrogen evolution curve and (b) tetrahydrofuran evolution curve.

It can be seen from the above analysis that the nano magnesium hydride can be successfully prepared by this method. The sample was heated from room temperature to 400° C. at 2° C./min, and the desorption behavior of the sample during the heating process was analyzed by the mass spectrometer. It can be seen from FIG. 4 that the nano magnesium hydride only releases hydrogen during the heating process, and almost no tetrahydrofuran is released, indicating that the organic solvent has been completely removed in the dynamic vacuum. It can be seen from the dehydrogenation curve that the initial dehydrogenation temperature of the sample is below 100° C., and the peak value of the first dehydrogenation temperature is 190° C., which is lower than the dehydrogenation temperature of magnesium hydride samples prepared by conventional methods.

Control 1 Preparation of magnesium hydride without reaction promotion (1) Put 500 mg of anhydrous magnesium chloride and 500 mg of lithium hydride into a ball milling jar in an argon atmosphere glove box, and mill them for 3 hours at the speed of 350 r.p.m.;
(2) In an argon atmosphere glove box, take the ball-milled anhydrous magnesium chloride and lithium hydride totaling 600 mg (molar ratio 1:2), put them into a 250 ml flask, then inject 150 ml of ultra-dry tetrahydrofuran into the flask and stir for 12 h;
(3) The solid state powder in the ultrasonic product in step (3) is separated by centrifugation (8000 r.p.m.).

After the above experiments, it was found that the solid material could not be collected by centrifugation. It can be seen that the reaction between $MgCl_2$ and LiH has a higher energy barrier. In the absence of additional energy input (ultrasonic wave), the reaction kinetics between $MgCl_2$ and LiH is too slow at room temperature and pressure. Therefore, in the invention, ultrasound not only plays a role in controlling the agglomeration and growth of particles, but also plays a role in accelerating the chemical reaction between $MgCl_2$ and LiH.

Control 2

In a glove box filled with argon, a total of 1.2 g of anhydrous magnesium chloride and lithium hydride (molar ratio 1:2) are put into a ball milling jar, and the ball milling is performed on a high-energy ball mill. The ball milling atmosphere is argon atmosphere and the speed is 500 r.p.m., the ball-to-powder weight ratio is 120:1, and the milling time is 24 hours. Put the ball-milled sample in tetrahydrofuran for washing twice to remove the by-product lithium chloride, and then obtain solid powder by centrifugation, and remove the residual tetrahydrofuran under dynamic vacuum conditions (vacuum degree of $1 \times 10^{-3}$ Torr). The magnesium hydride prepared by the ball milling method can be obtained, and then the sample is heated to 400° C. at a heating rate of 2° C./min, and the hydrogen release behavior of the sample during the heating process is recorded by a mass spectrometer. The above operations are carried out under inert atmosphere.

Figure 5:
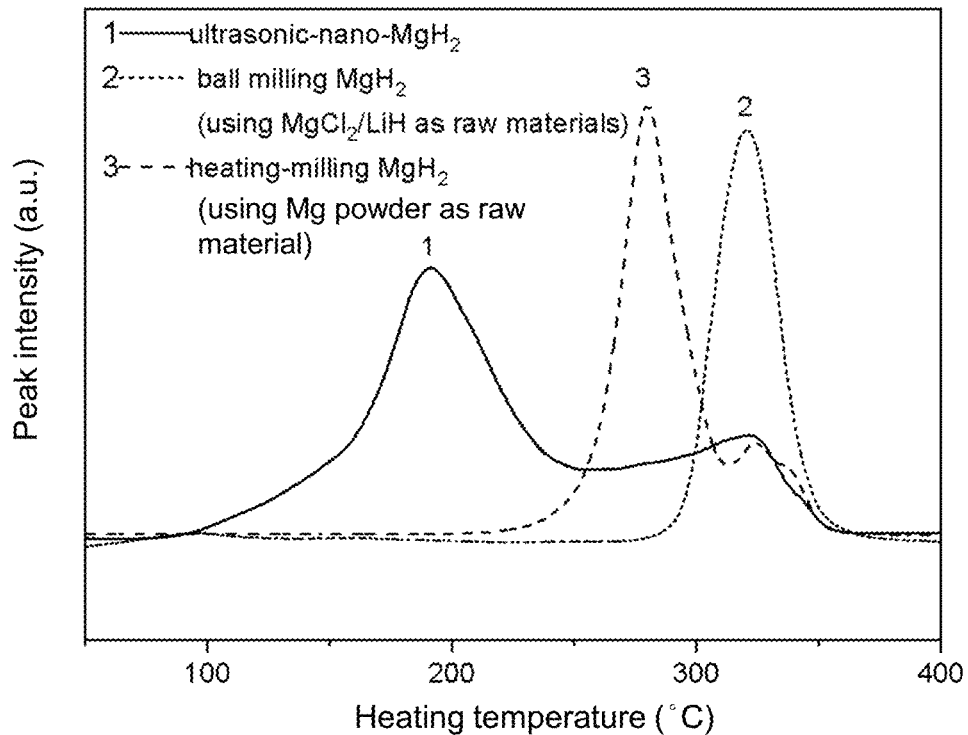
FIG. 5 shows the temperature-dependent desorption mass spectrometry curves of the nano magnesium hydride prepared in example 1 and the magnesium hydrides prepared in controls 2 and 3.

It can be seen from FIG. 5 that the initial temperature of the nano magnesium hydride prepared by the ultrasonic-assisted method is lower than that of the magnesium hydride prepared by the ball milling method by 180° C., the peak temperature of the hydrogen release in the first step is reduced by 130° C., and the hydrogen release performance is significantly improved.

Figure 6:
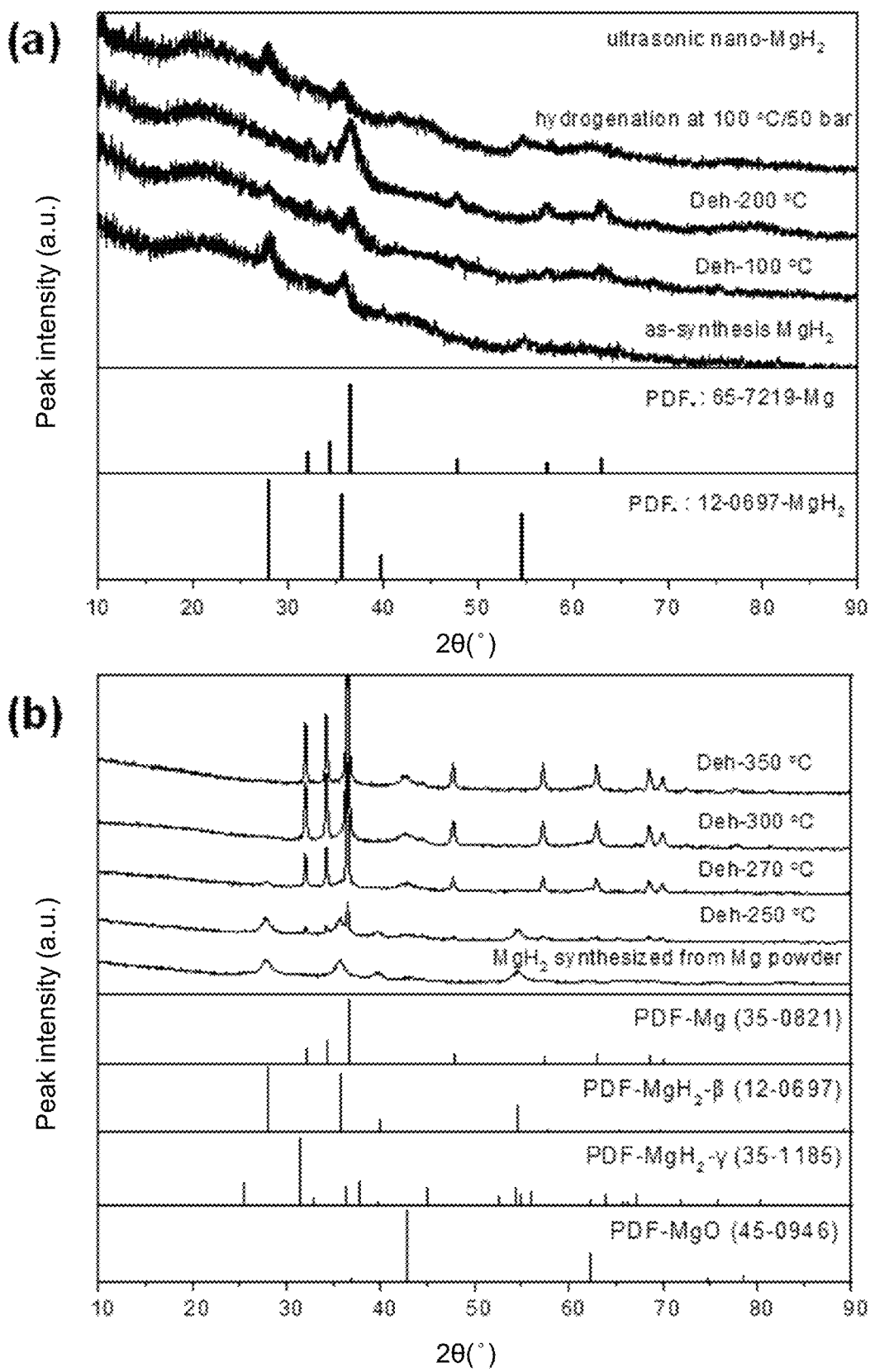
FIG. 6 shows the XRD patterns of the nano magnesium hydride samples prepared by (a) example 1 and the nano magnesium hydride prepared by (b) controls 2 and 3 to different stages of dehydrogenation.

It can be seen from FIG. 6(*a*) that the diffraction peak intensity of the prepared magnesium hydride due to the fine particles of $MgH_2$ is lower and the peak width is larger. During the hydrogen release process, the diffraction peak of Mg gradually appears and strengthens with the increase of temperature. After the dehydrogenated product absorbs hydrogen, the Mg peak disappears. Compared with the hydrogen desorption process of $MgH_2$ prepared by the traditional method in Control 2, the metal magnesium obtained by the decomposition of the nano magnesium hydride prepared by ultrasound has smaller particles, a larger proportion of surface atoms, worse lattice order, and wider diffraction peak, compared with the product of dehydrogenation prepared by the traditional method, the crystallinity of which is better and the peak shape is sharper.

Control 3

In a glove box filled with argon, 1 g of magnesium powder was put into a stainless steel tubular reactor, filled with high-purity hydrogen at 20 atm, and then the reactors are heated to 550 and 350° C., respectively. Keep the temperature for 4 hours each to ensure that the magnesium powder in the reactors is fully hydrogenated to convert to magnesium hydride. Subsequently, the magnesium hydride in the reactor is transferred to the ball milling jar and filled with 50 atmospheres of high-purity hydrogen. Ball milling is conducted at a speed of 500 r.p.m. and a ball-to-powder weight ratio of 120:1. The magnesium hydride is obtained after ball milling for 24 hours. Then, the sample is heated to 400° C. at a heating rate of 2° C./min, and the hydrogen release behavior during the heating process is recorded by a mass spectrometer.

It can be seen from FIG. 5 that the initial temperature of the nano-magnesium hydride prepared by the ultrasonic-assisted method is lower by 125° C. than the magnesium hydride prepared by the heating-ball milling method, and the peak temperature of the hydrogen release in the first step is reduced by 90° C., and the hydrogen release performance is significantly improved. It can be seen from FIG. 6(*b*) that the crystal lattice structure of the Mg generated during the hydrogen desorption process of $MgH_2$ in this example is obviously different from of that obtained by the decomposition of the nano magnesium hydride prepared by ultrasound.

Example 2 Preparation of Ti-Catalyzed Nano Magnesium Hydride (1) Put anhydrous magnesium chloride (500 mg) and lithium hydride (500 mg) into a ball milling tank in an argon atmosphere glove box, and crush them for 3 hours at a speed of 350 rpm/min.
(2) In an argon atmosphere glove box, take the ball-milled anhydrous magnesium chloride and lithium hydride (molar ratio 1:2) totaling 600 mg and titanium tetrachloride (16.4 µL), put them into a 250 ml flask, and then pour into the flask 100 ml of ultra-dry cyclohexane. They are stirred for 30 minutes. The molar ratio of Ti catalyst to magnesium chloride in this example is 0.03:1.
(3) Insert the ultrasonic horn into the flask, keep the end of the ultrasonic rod in the middle of the mixture in the flask, and perform ultrasonic treatment with 210 W output power. During the ultrasonic process, in order to keep the sample temperature from rising, the continuous ultrasonic must be paused after half an hour. After 6 hours of treatment, an ultrasonic product is obtained.
(4) Use centrifugation (8000 r.p.m.) to separate the solid powder in the ultrasonic product in step (3), and then put it into a 100 ml flask and inject 50 ml of ultra-dry tetrahydrofuran, and magnetically stir for 2 hours for cleaning to make sure that the lithium chloride as by-products is fully dissolved in tetrahydrofuran.

(5) The solid powder obtained in step (4) is separated by centrifugation (8000 r.p.m.), washed again with tetrahydrofuran and centrifuged to obtain the solid powder, and kept in a dynamic vacuum (vacuum degree of $1\times10^{-3}$ Torr) for 2 hours to remove the residual tetrahydrofuran. The Ti-catalyzed doped nano magnesium hydride named nano-$MgH_2$-0.03Ti can be obtained, and then the sample is stored in a glove box for later use.

Figure 7:
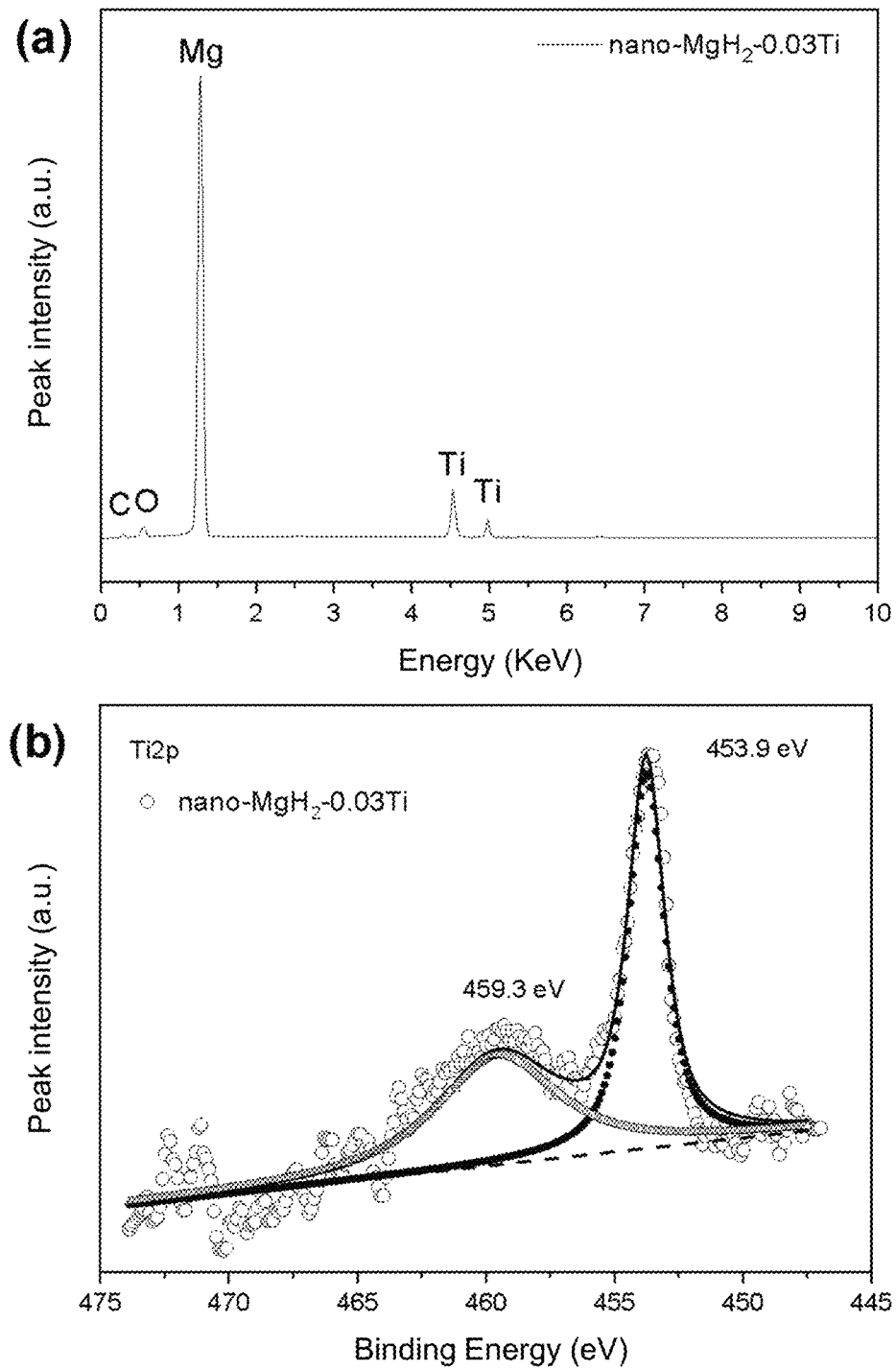
FIG. 7 shows (a) the EDS spectrum and (b) the XPS spectrums of Ti-catalyzed nano magnesium hydride prepared in example 2.

It can be seen from FIG. 7(a) that the sample contains only magnesium and titanium elements. The weak oxygen and carbon signals come from carbon and oxygen pollution in the air or trace organic solvent residues, indicating that the main phase of the sample is magnesium hydride and a small amount of titanium as a catalyst. It can be seen from FIG. 7(b) that the Ti $2p_{3/2}$-$2p_{1/2}$ dual spin-orbit peaks of the titanium element in the obtained sample are located at 453.9 and 459.3 eV, respectively, indicating that $TiCl_4$ has been completely reduced to Ti element by this method. It can be seen that ultrasound can not only trigger the synthesis reaction of $MgH_2$, but also trigger the reduction reaction of $TiCl_4$ by LiH.

Figure 8:
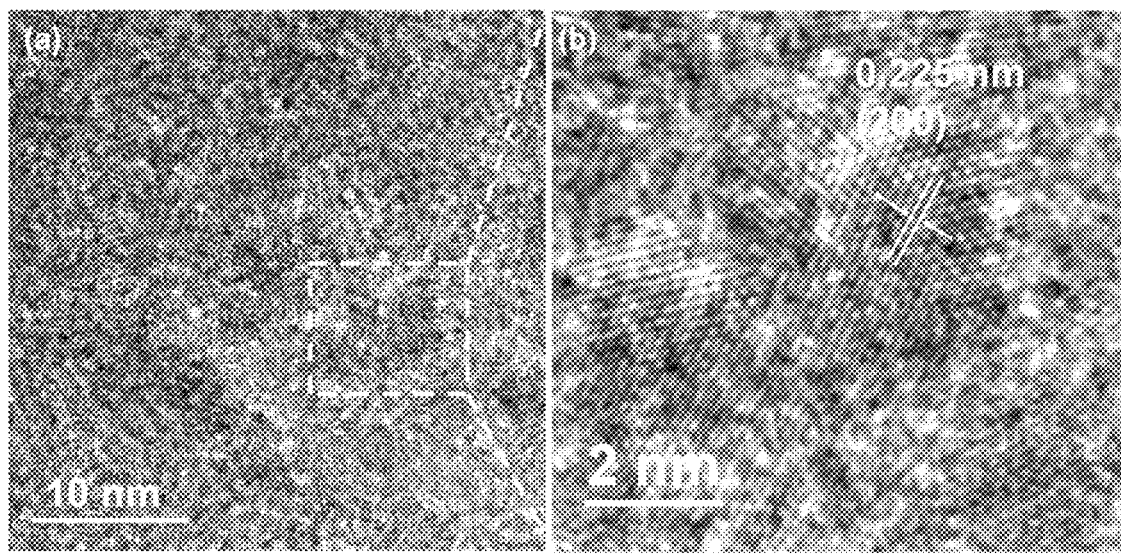
FIG. 8 shows (a) the TEM image and (b) the high-resolution TEM image of the Ti-catalyzed doped nano magnesium hydride prepared in example 2.

It can be seen from FIG. 8 that the nano magnesium hydride are basically maintained at 5 nm. From the high-resolution transmission photos, it can be calibrated that the interplanar spacing of the magnesium hydride particles 0.225 nm corresponds to the (200) crystal plane.

It can be seen from the above analysis that the method can successfully prepare Ti-catalyzed doped nano magnesium hydride samples. The sample is heated from room temperature to 400° C. at 2° C./min, and the degassing curve of the sample during the heating process was analyzed by a mass spectrometer. It can be seen from the FIG. 9 that the initial hydrogen release temperature of the sample is 40° C., the peak temperature of hydrogen release in the first step is 115° C., which is lower than that of magnesium hydride samples prepared by conventional methods.

In addition, for the Ti-catalyzed-doped nano magnesium hydride samples prepared with the molar ratio of Ti catalyst to magnesium chloride of 0.01:1 and 0.05:1, the desorption behavior of the sample during heating was analyzed by a mass spectrometer. The hydrogen release temperature is 35° C. (0.01:1) and 50° C. (0.05:1). The peak temperature of hydrogen release in the first step is 90° C. (0.01:1) and 125° C. (0.05:1) (FIG. 9).

Control 4

In a glove box filled with argon, put anhydrous magnesium chloride and lithium hydride (molar ratio 1:2, total 1.2 g) and titanium tetrachloride (32.5 µL) into a ball milling tank, and perform ball milling on a high-energy ball mill. The atmosphere is argon, the speed is 500 r.p.m., the ball-to-powder weight ratio is 120:1, and the ball milling time is 24 hours. The sample after ball milling is placed in tetrahydrofuran under an inert atmosphere and washed twice to remove lithium chloride as the by-product. Then, the solid powder is obtained by centrifugation, and the residual tetrahydrofuran is removed under dynamic vacuum conditions (vacuum degree is $1\times10^{-3}$ Torr) to obtain titanium-catalyzed magnesium hydride. In the sample, the molar ratio of titanium catalyst to magnesium chloride is 0.03:1, and then the sample is heated to 400° C. at a heating rate of 2° C./min, and the mass spectrometer is used to record the sample's heating process hydrogen release behavior.

Figure 9:
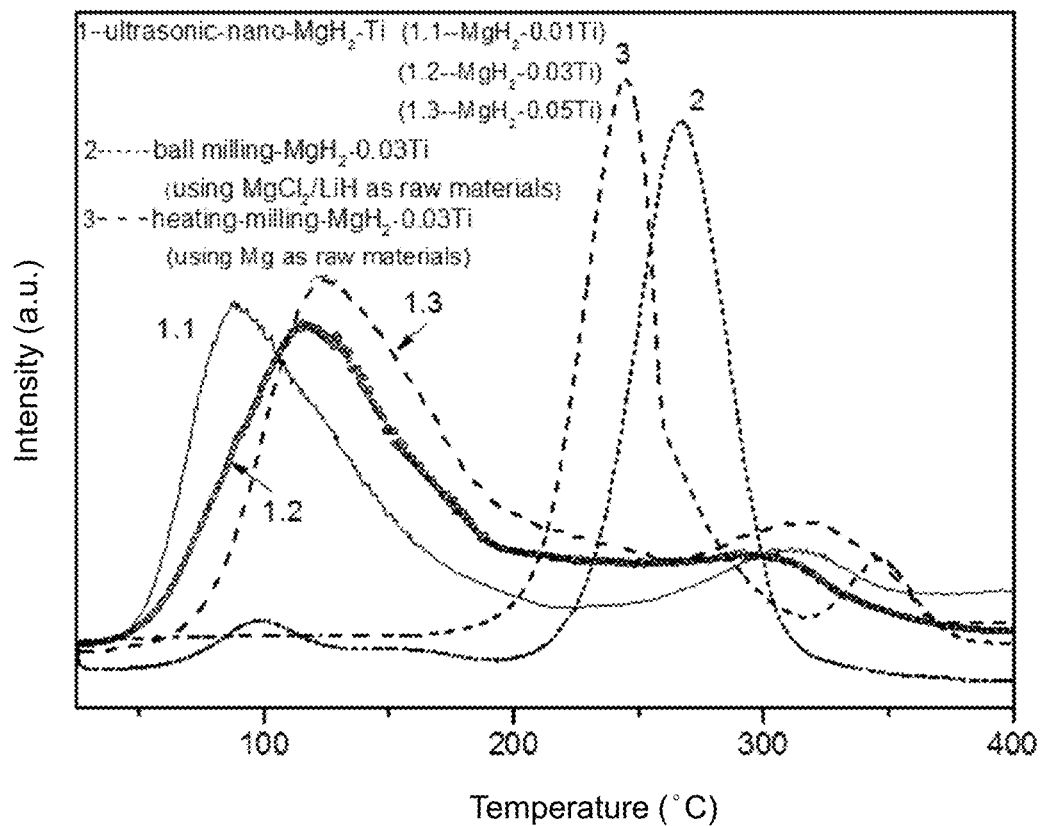
FIG. 9 shows the temperature-dependent desorption mass spectrometry curves of Ti-doped nano magnesium hydride prepared in example 2 and the $TiCl_4$ doped nano magnesium hydride prepared in controls 2 and 3.

It can be seen from FIG. 9 that the Ti-catalyzed-doped nano magnesium hydride prepared by the ultrasonic-assisted method has a lower initial temperature of 140° C. than that prepared by the ball milling method, and the peak temperature of the hydrogen release in the first step is reduced by 143° C. The hydrogen desorption performance is significantly better than that prepared by ball milling.

Control 5

In a glove box filled with argon, 1 g of magnesium powder was put into a stainless steel tubular reactor, and the reactor was filled with 20 atm of high-purity hydrogen, and then the reactor was heated to 550 and 350° C. for 4 hours each to hydrogenate the magnesium powder in the reactor to form magnesium hydride. Subsequently, the magnesium hydride in the reactor was transferred to a ball milling jar, and after adding 32.5 µL of titanium tetrachloride, it was filled with 50 atmospheres of high-purity hydrogen, the speed is 500 rpm/min, and the ball-to-powder weight ratio is 120:1. After 4 hours of ball milling, the titanium-catalyzed magnesium hydride was obtained.

It can be seen from FIG. 9 that the Ti-catalyzed doped nano-magnesium hydride prepared by the ultrasonic-assisted method has a lower initial temperature of 120° C. than the Ti-catalyzed magnesium hydride prepared by the heating-ball milling method. The temperature is reduced by 110° C. and the hydrogen release performance is significantly improved.

Control 6

Using the same method described in Example 3, ultrasonic treatment was employed to prepare the Ti-catalyzed doped nano magnesium hydride, and the amount of $TiCl_4$ in it was increased. The molar ratio of Ti catalyst to magnesium chloride is 0.1:1.

Figure 10:
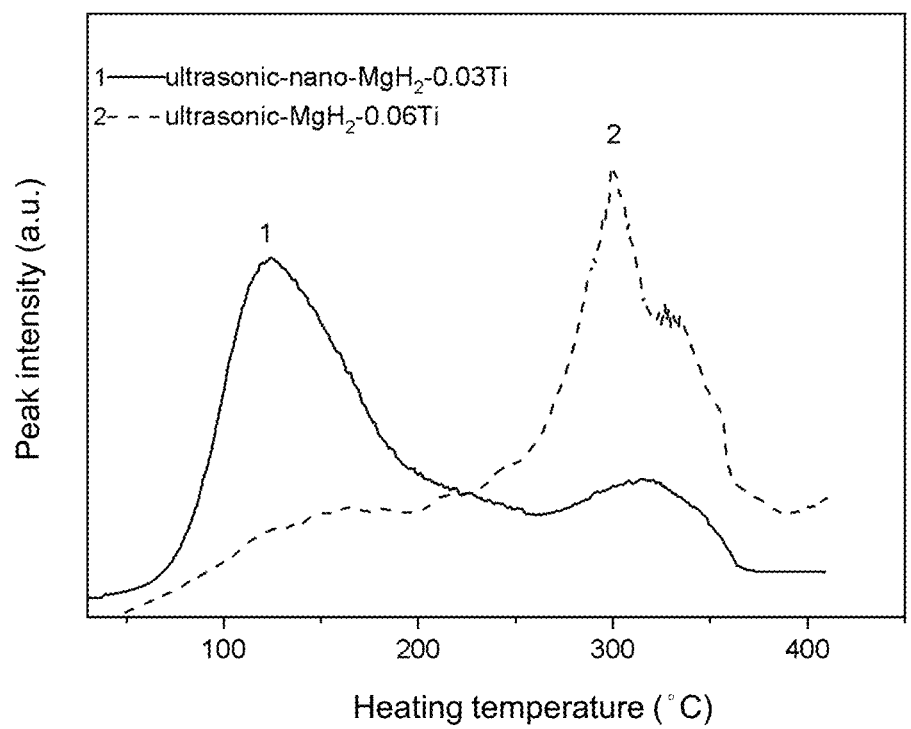
FIG. 10 shows the mass spectra of dehydrogenation of magnesium hydride with different amounts of Ti catalyst additions prepared in example 2 and control 6.

It can be found from FIG. 10 that the performance is significantly worse after increasing the amount of $TiCl_4$. The main hydrogen release peak shifts to the high temperature region, and there is only weak hydrogen release in the low temperature region. This indicates that the addition of excessive catalyst will have an adverse effect on the ultrasonic promotion of the reaction of $MgCl_2$ and LiH [$MgCl_2$+ 2LiH→$MgH_2$+2LiCl], resulting in the decrease of the energy barrier of the reaction, the promotion of product crystallization of the excess energy, and the increase of the particle size of $MgH_2$.

Figure 11:
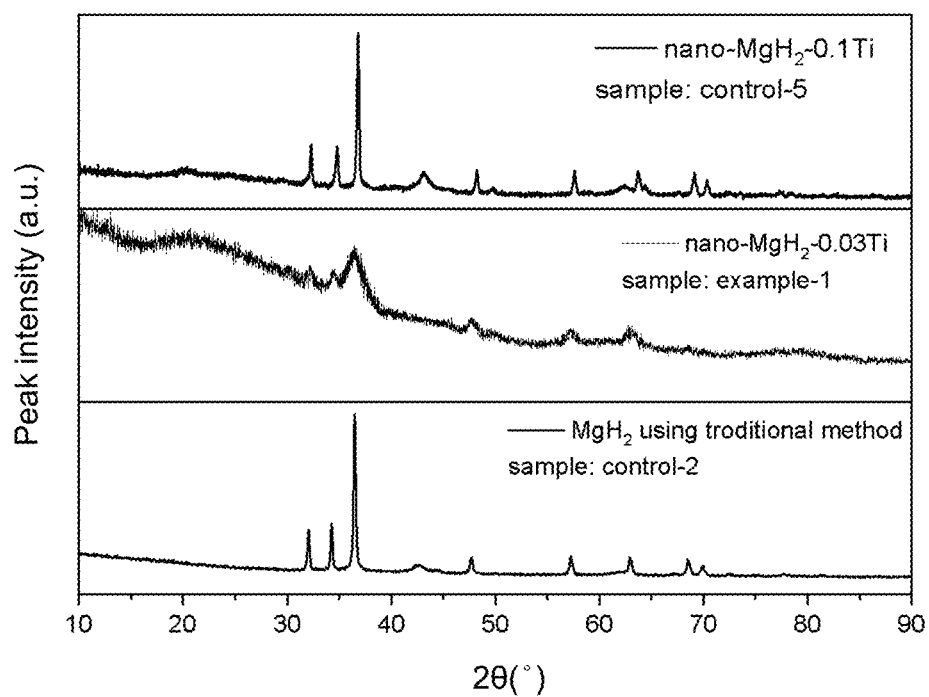
FIG. 11 shows the XRD patterns of the dehydrogenation products of magnesium hydride prepared in example 2 and control 6 with different amounts of Ti catalyst.

It can be seen from FIG. 11 that after adding an excessive amount of catalyst, the Mg product of the sample hydrogenation showed a peak similar to that of the sample hydrogenation product of control 2 (traditional method).

Example 3 Preparation of Nano Magnesium Hydride Doped with V Catalyst

The preparation method is the same as in example 2, but the difference is that the transition metal catalyst used is vanadium trichloride. Table 1 lists the corresponding raw material ratio and key processes. The sample is named nano-$MgH_2$-0.03V.

TABLE 1

Nano-$MgH_2$-0.03 V sample preparation process and raw material ratio

| Ultrasonic power (W) | Ultrasound time (h) | $MgCl_2$ + LiH (mg) | $VCl_3$ (mg) |
|---|---|---|---|
| 210 | 6 | 600 | 24 |

Figure 12:
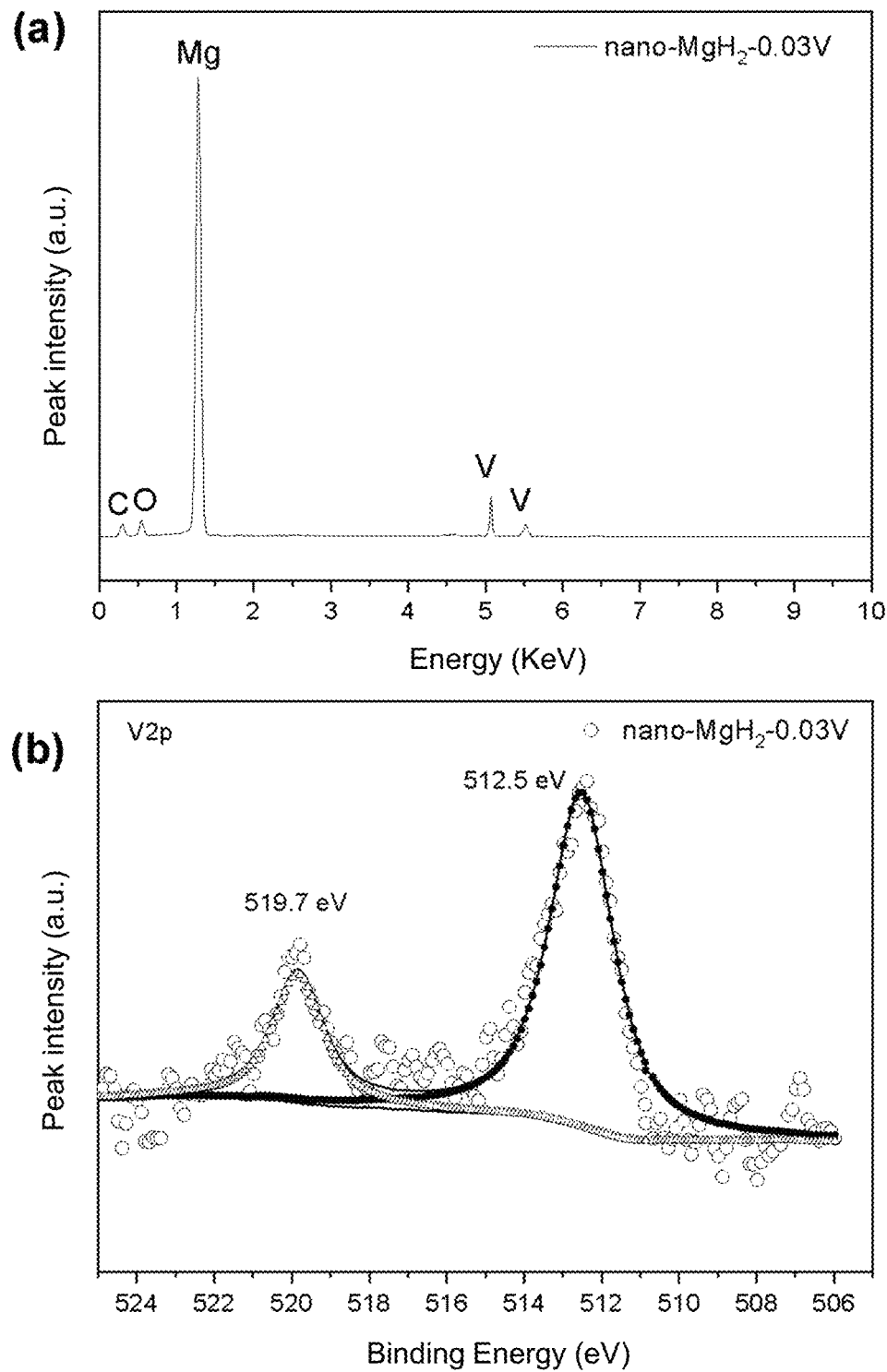
FIG. 12 shows (a) the EDS spectrum and (b) the V XPS spectrum of the nano magnesium hydride doped with vanadium prepared in example 3.

It can be seen from FIG. 12(a) that the sample contains only magnesium and vanadium. The weak oxygen and carbon signals come from carbon and oxygen pollution in the air or residual trace organic solvents, indicating that the main phase of the sample is magnesium hydride and a small amount of vanadium as the catalyst. It can be seen from FIG. 12(b) that the $V2p_{3/2}$-$Vp_{1/2}$ spin-orbit peaks in the obtained sample are located at 512.5 and 519.7 eV, respectively, indicating that VCl₃ has been completely reduced to V element by this method.

Figure 13:
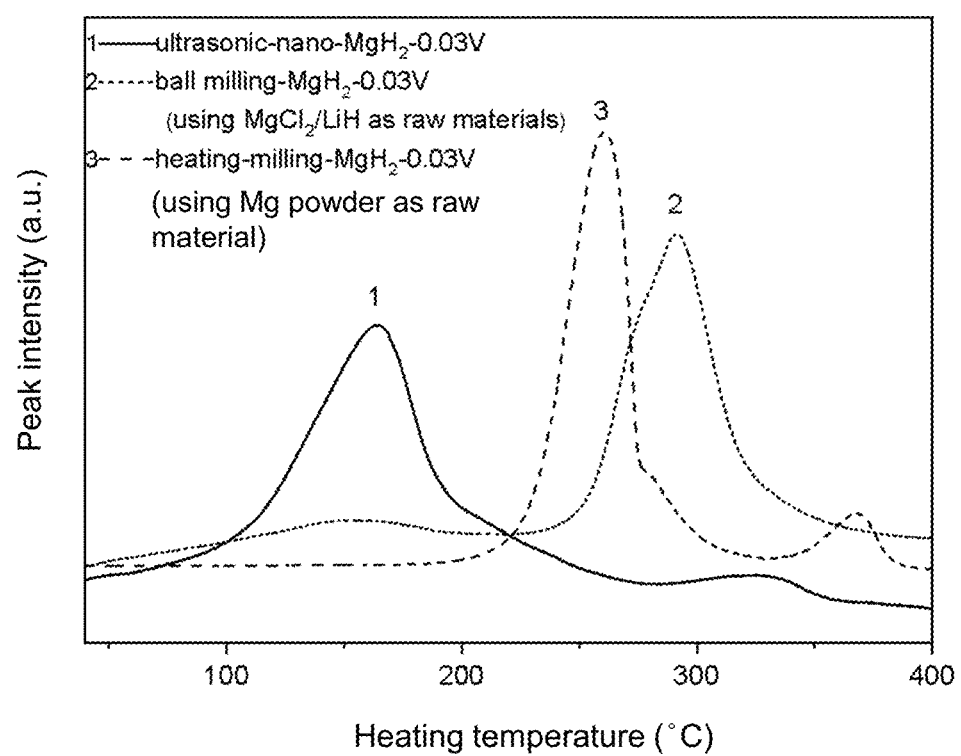
FIG. 13 shows the temperature-dependent desorption mass spectrometry curves of V-doped nano magnesium hydride prepared in example 3 and the $VCl_2$ doped nano magnesium hydride prepared in controls 7 and 8.

The dehydrogenation curve (2° C./min) of the sample was analyzed by a mass spectrometer (FIG. 13). The hydrogen desorption performance parameters of the sample in this example are summarized in Table 4. The dehydrogenation temperature of the sample was lower than that of the conventional method.

Control 7

The preparation method is the same as in control 4, but the difference is that the transition metal catalyst used is vanadium trichloride. Table 2 lists the corresponding raw material ratio and key processes.

TABLE 2

Preparation process of the sample in control 7 and raw material ratio

| Rotational speed (r.p.m.) | ball-to-powder weight ratio | Ball milling time (h) | MgCl₂ + LiH (mg) | VCl₃ (mg) |
|---|---|---|---|---|
| 500 | 120:1 | 24 | 1200 | 47 |

In the samples, the molar ratio of V catalyst to MgH₂ is 0.03:1. FIG. 13 shows the comparison of the hydrogen release curve of the sample of Example 3 and the sample of this control example. The relevant hydrogen release parameters are summarized in Table 4.

Control 8

The preparation method is the same as in control 5, but the difference is that the transition metal catalyst used is vanadium trichloride. Table 3 lists the corresponding raw material ratio and key processes.

TABLE 3

Preparation process of the sample in control 8 and raw material ratio

| Rotational speed (r.p.m.) | ball-to-powder weight ratio | Ball milling time (h) | Magnesium powder (mg) | VCl₃ (mg) |
|---|---|---|---|---|
| 500 | 120:1 | 24 | 1000 | 200 |

In the samples, the molar ratio of V catalyst to MgH₂ is 0.03:1. FIG. 13 shows the comparison of the hydrogen release curve of the sample of Example 3 and the sample of this control. The relevant hydrogen release performance parameters are summarized in Table 4.

TABLE 4

Performance comparison of V catalyzed MgH₂ samples

| Sample name | Initial dehydrogenation temperature (° C.) | Peak temperature (° C.) |
|---|---|---|
| nano-MgH₂-0.03 V | 70 | 163 |
| Control 7 | 245 | 293 |
| Control 8 | 220 | 263 |

It can be seen from the performance comparison of the samples summarized in Table 4 that the samples prepared by the ultrasound-assisted method have better hydrogen desorption kinetics than those prepared by the traditional method.

Example 4 Preparation of Nano Magnesium Hydride Doped with Zr Catalyst

The preparation method is the same as in example 2, but the difference is that the transition metal catalyst used is zirconium tetrachloride. Table 5 lists the corresponding raw material ratio and key processes. The sample is named nano-MgH₂-0.03Zr.

TABLE 5

Nano-MgH₂-0.03Zr preparation process and raw material ratio

| Ultrasonic power (W) | Ultrasound time (h) | MgCl₂ + LiH (mg) | ZrCl₄ (mg) |
|---|---|---|---|
| 210 | 10 | 600 | 35 |

Figure 14:
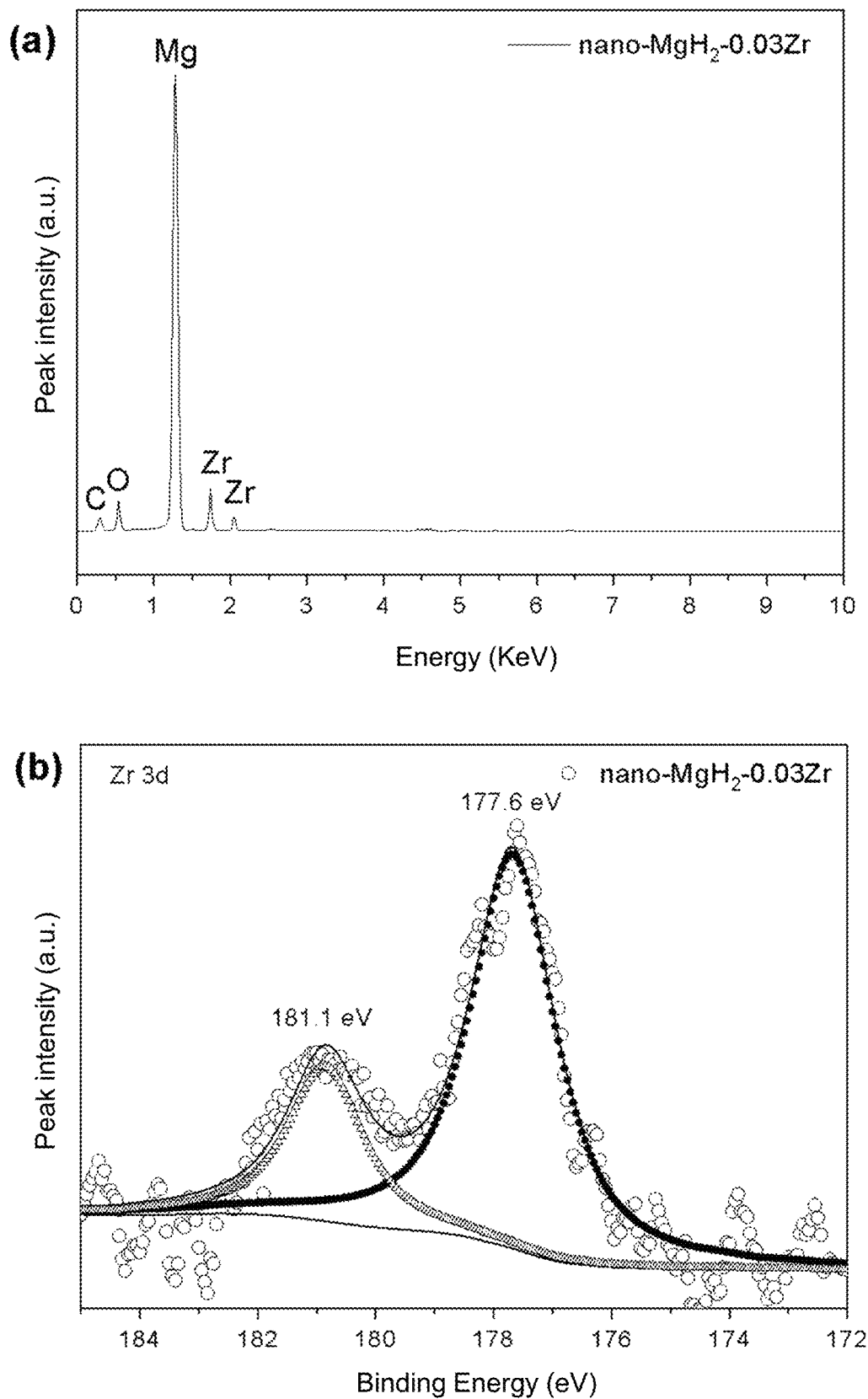
FIG. 14 shows (a) the EDS spectrum and (b) the Zr XPS spectrum of the nano magnesium hydride doped with zirconium prepared in example 4.

FIG. 14(a) shows the energy dispersive spectrometer data (EDS) of the sample. It can be seen from the FIG. 14(a) that the sample contains only magnesium and zirconium. The weak oxygen and carbon signals come from carbon and oxygen pollution in the air or residual trace organic solvent, indicating that the main phase of the sample is magnesium hydride, and a small amount of zirconium is used as a catalyst. FIG. 14 shows the X-ray photoelectron spectroscopy (XPS) of zirconium in the sample. It can be seen that the $Zr3d_{5/2}$–$3d_{3/2}$ spin orbit peaks in the sample are located at: 177.6 and 181.1 eV, indicating that using this method, ZrCl₄ has been completely reduced to zirconium.

Figure 15:
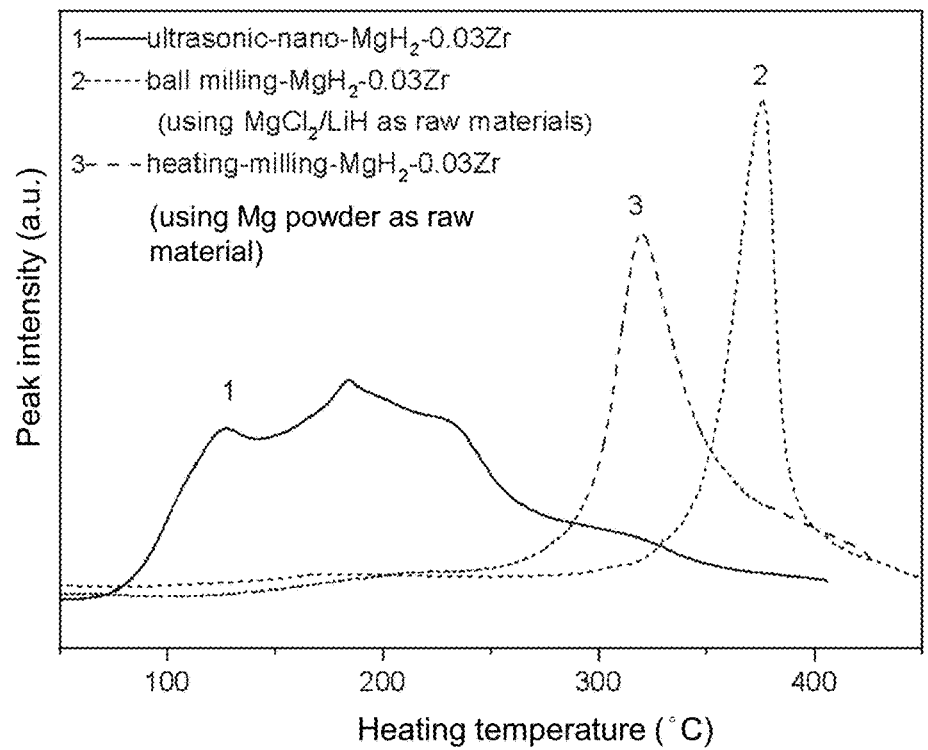
FIG. 15 shows the temperature-dependent desorption mass spectrometry curves of Zr-doped nano magnesium hydride prepared in example 4 and the $TiCl_4$ doped nano magnesium hydride prepared in controls 9 and 10.

From the above analysis, it can be seen that the Zr-catalyzed nano-magnesium hydride sample can be successfully prepared by this method. The dehydrogenation curve (2° C./min) of the sample was analyzed by a mass spectrometer (FIG. 15). The hydrogen desorption parameters of the sample are summarized in Table 8. The sample has a lower hydrogen desorption temperature than the magnesium hydride sample prepared by the conventional method.

Control 9

The preparation method is the same as in control 4, but the difference is that the transition metal catalyst used is zirconium tetrachloride. Table 6 lists the corresponding raw material ratio and key processes.

TABLE 6

Preparation process of the sample in control 9 and raw material ratio

| Rotational speed (r.p.m.) | ball-to-powder weight ratio | Ball milling time (h) | MgCl₂ + LiH (mg) | ZrCl₄ (mg) |
|---|---|---|---|---|
| 500 | 120:1 | 24 | 1200 | 70 |

FIG. 15 shows the comparison diagram of the hydrogen release curve of the sample of example 4 and the sample of this control example. The performance parameters of the sample of this control example are summarized in Table 8.

Control 10

The preparation method is the same as in control 5, but the difference is that the transition metal catalyst used is zirconium tetrachloride. Table 7 lists the corresponding raw material ratio and key processes.

TABLE 7

Preparation process of the sample in control 10 and raw material ratio

| Rotational speed (r.p.m.) | ball-to-powder weight ratio | Ball milling time (h) | Magnesium powder (mg) | $ZrCl_4$ (mg) |
|---|---|---|---|---|
| 500 | 120:1 | 24 | 1000 | 270 |

In the samples, the molar ratio of Zr catalyst to $MgH_2$ is 0.03:1. FIG. 15 shows the hydrogen release curves of the sample of Example 4 and the sample of this control. The relevant hydrogen release parameters are summarized in Table 8.

TABLE 8

Performance comparison of V catalyzed $MgH_2$ samples

| Sample name | Initial dehydrogenation temperature (° C.) | Peak temperature (° C.) |
|---|---|---|
| nano-$MgH_2$-0.03 V | 70 | 163 |
| Control 9 | 245 | 293 |
| Control 10 | 220 | 263 |

It can be seen from Table 8 that the samples prepared by the ultrasound-assisted method have better hydrogen desorption kinetics than those prepared by the traditional method.

Example 5 Preparation of Nano Magnesium Hydride Doped by Nb Catalysis

The preparation method is the same as in example 2, but the difference is that the transition metal catalyst used is niobium pentachloride. Table 9 lists the corresponding raw material ratio and key processes. The sample is named nano-$MgH_2$-0.03Zr.

TABLE 9

Nano-$MgH_2$-0.03Nb preparation process and raw material ratio

| Ultrasonic power (W) | Ultrasound time (h) | $MgCl_2$ + LiH (mg) | $NbCl_5$ |
|---|---|---|---|
| 210 | 10 | 600 | 40 |

Figure 16:
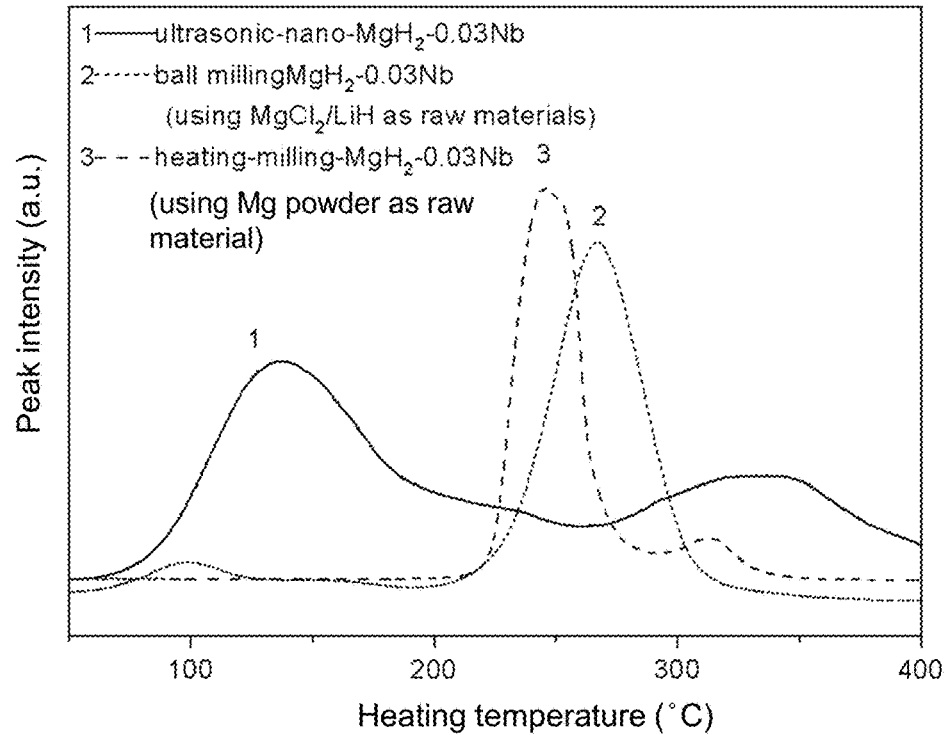
FIG. 16 shows the temperature-dependent desorption mass spectrometry curves of Nb-doped nano magnesium hydride prepared in example 5 and the $NbCl_5$ doped nano magnesium hydride prepared in controls 11 and 12.

FIG. 16 shows the dehydrogenation curve (2° C./min) of the sample during heating. The hydrogen desorption parameters of the sample are summarized in Table 12. Compared with the magnesium hydride sample prepared by the conventional method, the hydrogen desorption temperature is better.

Control 11

The preparation method is the same as in control 4, but the difference is that the transition metal catalyst used is niobium pentachloride. Table 10 lists the corresponding raw material ratio and key processes.

TABLE 10

Preparation process of the sample in control 11 and raw material ratio

| Rotational speed (r.p.m.) | ball-to-powder weight ratio | Ball milling time (h) | $MgCl_2$ + LiH (mg) | $NbCl_5$ (mg) |
|---|---|---|---|---|
| 500 | 120:1 | 24 | 1200 | 80 |

In the samples, the molar ratio of Nb catalyst to MgH2 is 0.03:1. FIG. 16 shows the comparison of the hydrogen release curve of the sample of Example 5 and the sample of this control. The relevant hydrogen release performance parameters are summarized in Table 12.

Control 12

The preparation method is the same as in control 5, but the difference is that the transition metal catalyst used is niobium pentachloride. Table 11 lists the corresponding raw material ratio and key processes.

TABLE 11

Preparation process of the sample in control 12 and raw material ratio

| Rotational speed (r.p.m.) | ball-to-powder weight ratio | Ball milling time (h) | Magnesium powder (mg) | $NbCl_5$ (mg) |
|---|---|---|---|---|
| 500 | 120:1 | 24 | 1000 | 310 |

In the samples, the molar ratio of Nb catalyst to $MgH_2$ is 0.03:1. FIG. 16 shows the comparison of the hydrogen release curve of the sample of Example 5 and the sample of this control. The relevant hydrogen release parameters are summarized in Table 12.

TABLE 12

Performance comparison of Nb catalyzed $MgH_2$ samples

| Sample name | Initial dehydrogenation temperature (° C.) | Peak temperature (° C.) |
|---|---|---|
| nano-$MgH_2$-0.03Nb | 65 | 137 |
| Control 11 | 205 | 267 |
| Control 12 | 210 | 247 |

It can be seen from Table 12 that the samples prepared by the ultrasound-assisted method have better hydrogen evolution kinetics than those prepared by the traditional method.

Example 6 Preparation of Ni-Catalyzed Nano Magnesium Hydride Sample

The preparation method is the same as in example 2, but the difference is that the transition metal catalyst used is nickel dichloride. Table 13 lists the corresponding raw material ratio and key processes. The sample is named nano-$MgH_2$-0.03Ni.

TABLE 13

| Nano-MgH$_2$-0.03Ni preparation process and raw material ratio | | | |
|---|---|---|---|
| Ultrasonic power (W) | Ultrasound time (h) | MgCl$_2$ + LiH (mg) | NiCl$_2$ (mg) |
| 210 | 10 | 600 | 20 |

Figure 17:
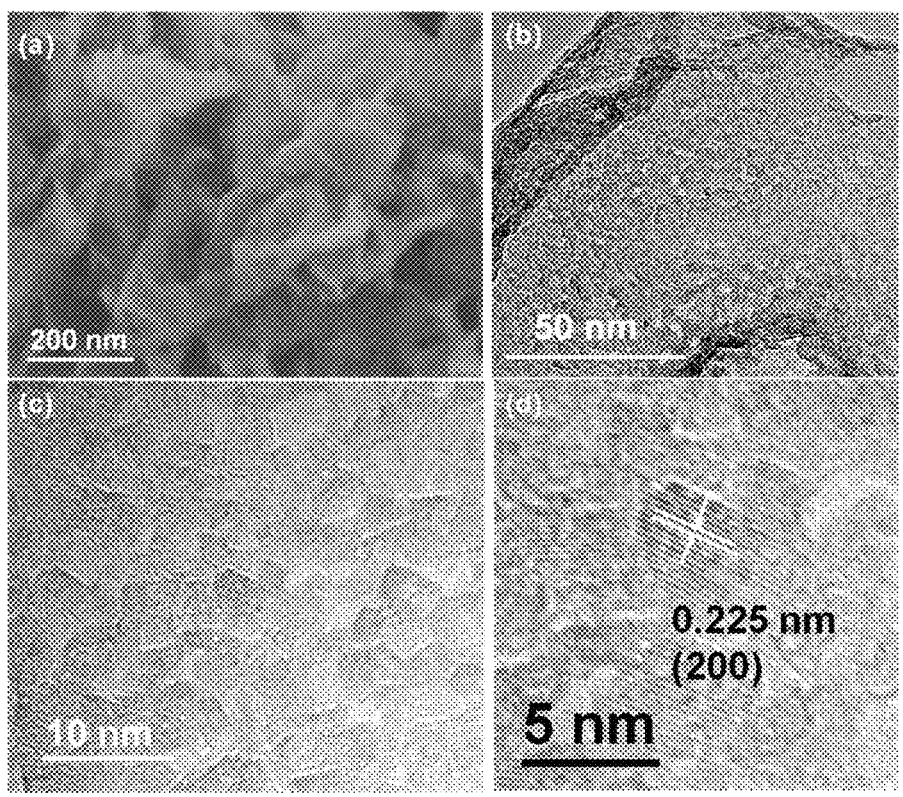
FIG. 17 shows (a) the SEM image, (b) the TEM image and (c,d) the high-resolution TEM image of the Ni-catalyzed nano magnesium hydride prepared in example 6.

FIG. 17 shows the SEM and TEM pictures of the nano-MgH$_2$-0.03Ni sample. It can be seen that the sample presents a layered structure similar to graphene. From the TEM picture, it can be seen that each layer of the sample contains a large number of magnesium hydride nanoparticles, the particle size is maintained at about 3 nanometers. It can be seen that by changing the composition of the additives, the morphology of the product can be adjusted to a certain extent.

Figure 18:
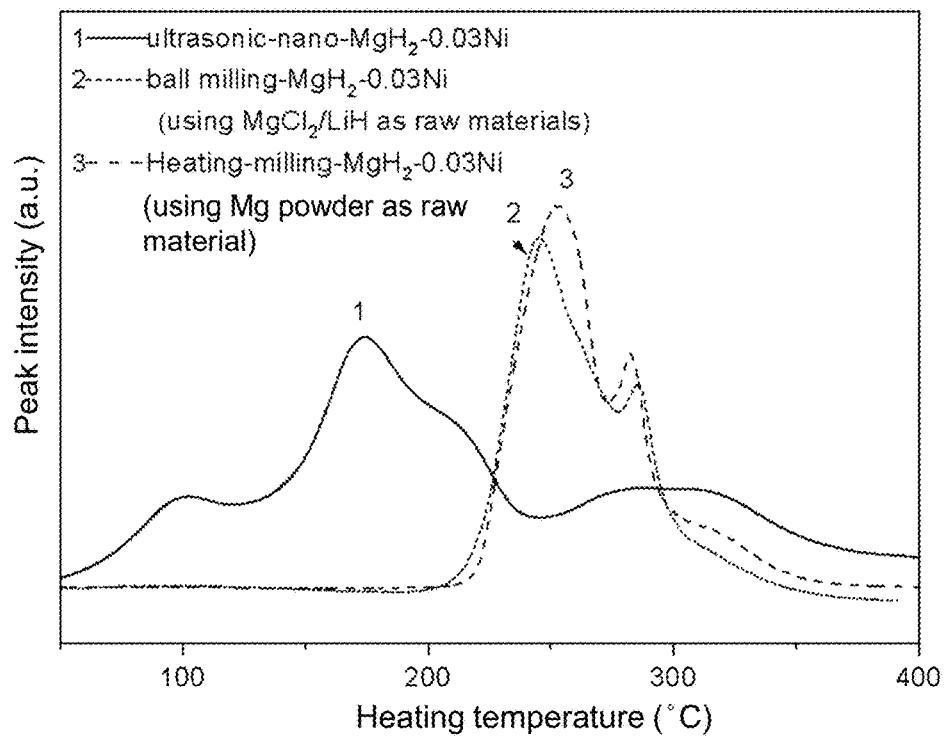
FIG. 18 shows the temperature-dependent desorption mass spectrometry curves of the Ni-catalyzed nano-magnesium hydride prepared in example 6 and the $NiCl_2$-doped magnesium hydride prepared by the traditional method.

FIG. 18 shows the dehydrogenation curve (2° C./min) of the sample during heating. The hydrogen desorption parameters of the sample are summarized in Table 16. Compared with the magnesium hydride sample prepared by the conventional method, the hydrogen desorption temperature is lower.

Control 13

The preparation method is the same as in control 4, but the difference is that the transition metal catalyst used is nickel dichloride. Table 14 lists the corresponding raw material ratio and key processes.

TABLE 14

| Preparation process of the sample in control 13 and raw material ratio | | | | |
|---|---|---|---|---|
| Rotational speed (r.p.m.) | ball-to-powder weight ratio | Ball milling time (h) | MgCl$_2$ + LiH (mg) | NiCl$_2$ (mg) |
| 500 | 120:1 | 24 | 1200 | 80 |

In the samples, the molar ratio of Ni catalyst to MgH$_2$ is 0.03:1. FIG. 18 shows the hydrogen release curves of the sample of Example 6 and the sample of this control. The relevant hydrogen release parameters are summarized in Table 16.

Control 14

The preparation method is the same as in control 5, but the difference is that the transition metal catalyst used is nickel dichloride. Table 15 lists the corresponding raw material ratio and key processes.

TABLE 15

| Preparation process of the sample in control 14 and raw material ratio | | | | |
|---|---|---|---|---|
| Rotational speed (r.p.m.) | ball-to-powder weight ratio | Ball milling time (h) | Magnesium powder (mg) | NiCl$_2$ (mg) |
| 500 | 120:1 | 24 | 1000 | 150 |

In the samples, the molar ratio of Ni catalyst to MgH$_2$ is 0.03:1. FIG. 18 shows the hydrogen release curves of the sample of Example 6 and the sample of this control. The relevant hydrogen release parameters are summarized in Table 16.

TABLE 16

| Performance comparison of Ni catalyzed MgH$_2$ samples | | |
|---|---|---|
| Sample name | Initial dehydrogenation temperature (° C.) | Peak temperature (° C.) |
| nano-MgH$_2$-0.03Ni | 55 | 175 |
| Control 13 | 210 | 245 |
| Control 14 | 210 | 254 |

It can be seen from Table 16 that the samples prepared by the ultrasound-assisted method have better hydrogen evolution kinetics than those prepared by the traditional method.

What is claimed is:

1. An in-situ preparation method of nano magnesium hydride, comprising steps of:
   step (1) disposing and stirring magnesium dichloride and lithium hydride in a first organic solvent under a protection of an inert atmosphere, so as to obtain an organic suspension of a mixture;
   step (2) performing an ultrasonic treatment to the organic suspension under the protection of the inert atmosphere, so as to promote a chemical reaction of the mixture, after the chemical reaction is completed, the organic suspension is filtered to obtain a solid reaction product; and
   step (3) washing, centrifuging and drying the solid reaction product by using a second organic solvent under the protection of the inert atmosphere, so as to remove a residual organic material and obtain nano-magnesium hydride.

2. The in-situ preparation method of nano magnesium hydride of claim 1, wherein in step (1), before disposing magnesium dichloride and lithium hydride in the first organic solvent, magnesium dichloride and lithium hydride are ball milled together to obtain post-milled magnesium dichloride and lithium hydride;
   a rotational speed of the ball milling is 100-400 revolutions/hour, and a time of the ball milling is 3-12 hours.

3. The in-situ preparation method of nano magnesium hydride of claim 1, wherein in step (1), magnesium dichloride is anhydrous, and a molar ratio of magnesium dichloride to lithium hydride is 1:2.

4. The in-situ preparation method of nano magnesium hydride of claim 1, wherein in step (1), the first organic solvent is ultra-dry tetrahydrofuran, ultra-dry cyclohexane, or ultra-dry ether.

5. An in-situ preparation method of nano magnesium hydride, comprising steps of:
   step (1) disposing and stirring magnesium dichloride, lithium hydride, and a transition metal chloride in a first organic solvent under protection of an inert atmosphere to obtain an organic suspension of a mixture;
   step (2) performing an ultrasonic treatment to the organic suspension under the protection of the inert atmosphere, so as to promote a chemical reaction of the mixture, after the chemical reaction is completed, the organic suspension is filtered to obtain a solid reaction product; and
   step (3) washing, centrifuging and drying the solid reaction product by using a second organic solvent under the protection of the inert atmosphere, so as to remove residual organic material and obtain nano-magnesium hydride;

wherein the transition metal chloride is an anhydrous chloride, including titanium tetrachloride, titanium trichloride, zirconium tetrachloride, vanadium trichloride, niobium pentachloride, nickel dichloride or cobalt dichloride; and wherein the first organic solvent is ultra-dry tetrahydrofuran, ultra-dry cyclohexane, or ultra-dry ether; and wherein the second organic solvent is ultra-dry tetrahydrofuran, or ultra-dry acetone, a washing time is 1-2 h, and a drying treatment is achieved by heating under a protection of vacuum or inert atmosphere.

6. The in-situ preparation method of nano magnesium hydride of claim 5, wherein in step (1), magnesium dichloride is anhydrous, a molar ratio of magnesium dichloride to lithium hydride is 1:2, a molar ratio of the transition metal chloride and magnesium dichloride is 0.01-0.05:1, and a molar ratio of lithium hydride and chloride ion in the transition metal chloride is 1:1.

7. The in-situ preparation method of nano magnesium hydride of claim 1, wherein in step (2), an ultrasonic output power is 100-600 W, a single ultrasound time is 0.5-1 h, a pause time is 10-30 min, and an overall ultrasound time is 3-24 h.

8. The in-situ preparation method of nano magnesium hydride of claim 1, wherein in step (2), an ultrasonic rod is inserted into the organic suspension for the ultrasonic treatment.

9. The in-situ preparation method of nano magnesium hydride of claim 1, wherein in step (3), the second organic solvent is ultra-dry tetrahydrofuran, or ultra-thy acetone, a washing time is 1-2 h, a drying treatment is achieved by heating under a protection of vacuum or inert atmosphere.

10. A nano magnesium hydride, prepared by the in-situ preparation method of nano magnesium hydride of claim 1.

11. The in-situ preparation method of nano magnesium hydride of claim 5, wherein in step (1), before disposing magnesium dichloride, lithium hydride, and a transition metal chloride in the first organic solvent, magnesium dichloride, lithium hydride, and a transition metal chloride are ball milled together to obtain post-milled magnesium dichloride, lithium hydride, and a transition metal chloride;

wherein a rotational speed of the ball milling is 100-400 revolutions/hour, and a time of the ball milling is 3-12 hours.

12. The in-situ preparation method of nano magnesium hydride of claim 5, wherein in step (2), an ultrasonic output power is 100-600 W, a single ultrasound time is 0.5-1 h, a pause time is 10-30 min, an overall ultrasound time is 3-24 h, and an ultrasonic rod is inserted into the organic suspension for the ultrasonic treatment.

* * * * *